Feb. 8, 1927. 1,617,219

A. H. OELKERS

LUBRICATOR

Original Filed Aug. 13, 1924  2 Sheets-Sheet 1

Feb. 8, 1927.
A. H. OELKERS
1,617,219
LUBRICATOR
Original Filed Aug. 13, 1924    2 Sheets-Sheet 2
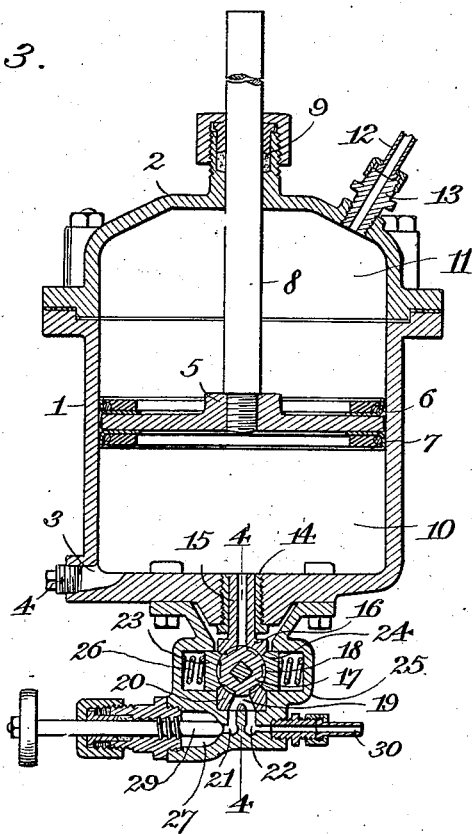
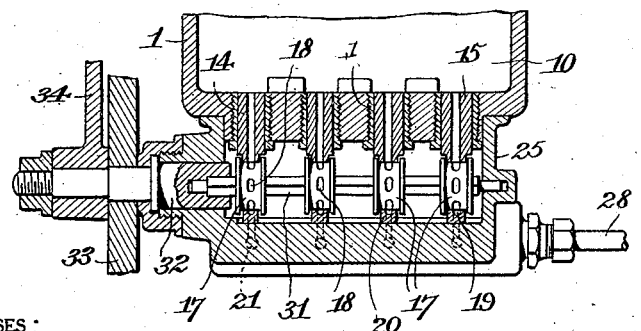
INVENTOR,
A. H. Oelkers.

Patented Feb. 8, 1927.

1,617,219

UNITED STATES PATENT OFFICE.

ALFRED H. OELKERS, OF SPRINGFIELD, MISSOURI.

LUBRICATOR.

Application filed August 13, 1924, Serial No. 731,808. Renewed December 7, 1926.

This invention relates to lubricators and has for an object to provide an improved construction utilizing pressure to force the lubricant to the desired point.

Another object of the invention is to provide a lubricator wherein desired quantities of lubricant may be fed to one or a large number of points under pressure from a single reservoir.

A still further object of the invention is to provide a lubricator wherein a plurality of rotating distributing drums are provided to supply different points with lubricant in desired quantities.

Another object of the invention is to provide a lubricator that will deliver either oil, soap or compounds.

A further object is to provide a lubricator combining the advantages of the present hydrostatic lubricator with the mechanical force feed lubricator, by providing one in which the lubricant is carried in a reservoir under pressure and is fed out by mechanical motion from the machine to be lubricated in quantities proportionate to the speed of the machine.

Another object of the invention is to provide a lubricator that will positively deliver a desired measured quantity of the lubricant to a pipe or chamber regardless of the pressure in same.

In the accompanying drawings—

Figure 3 is a transverse sectional view through Figure 1, approximately on line 3—3.

Figure 4 is a fragmentary sectional view through Figure 3, approximately on line 4—4.

Figure 1:
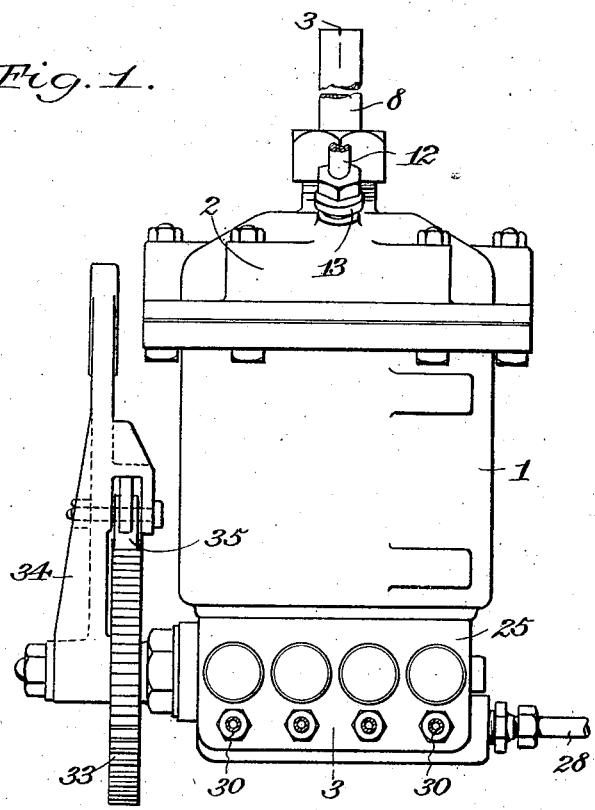
Figure 1 is an elevation of a lubricator, disclosing an embodiment of the invention.
Figure 2:
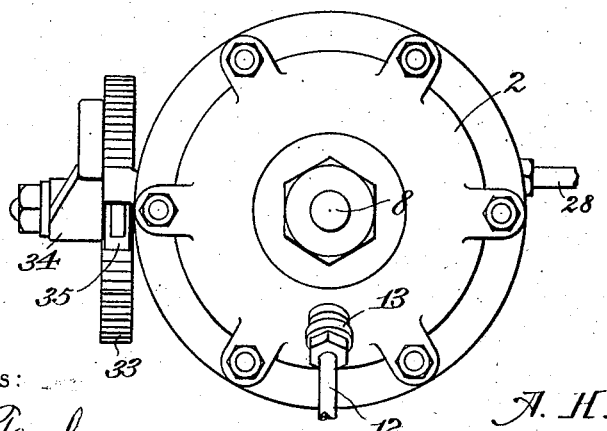
Figure 2 is a top plan view of the structure shown in Figure 1.

Referring to the accompanying drawings by numerals, 1 indicates a container provided with a top or cover 2 which is bolted or otherwise rigidly secured in place to produce a tight connection. The container or reservoir 1 is provided with an inlet 3 at the bottom which is normally closed by the plug 4 and is supplied with a piston 5 adapted to move in one direction when forcing the lubricant from the reservoir and to be moved in the opposite direction when a new supply is being provided. The piston 5 may be of any desired kind but is preferably of the kind having oppositely facing cup packings 6 and 7 so as to resist movement of liquid or fluid from either side to the opposite side. A guiding rod 8 is connected with the piston 5 and extends upwardly through a suitable packing gland 9 and the cover 2.

When the device is in use, the lubricant is located in the chamber 10, which is that part of the reservoir 1 below the piston 5. In the chamber 11, which is that part of the reservoir 1 and cap 2 above the piston 5, steam pressure or fluid pressure of some kind is maintained in order that the piston 5 may continually press against the lubricant in chamber 10. This pressure may be secured by connecting the chamber 2 to the boiler of the engine to which the lubricator is connected, the connection being through a suitable pipe 12 connected to cover 2 by a nipple 13. It is to be noted that the device may not only be used on a steam engine or in connection with a steam boiler but may be used in many other places, as for instance, air compressors and other machines needing a more or less constant supply of lubricant. The lubricant used may be any desired grade of oil but is preferably a lubricant of a bulky nature. The lubricant also is preferably of a kind which will present a compound to keep the cylinder free of carbon or residue, as for instance, a good grade of oil mixed with soap of any desired kind. The use of a bulky lubricant permits the feeding of large quantities to the cylinder which can also be more readily regulated than if pure lubricating oil is used.

In the bottom of the reservoir 1 are arranged a number of guiding sleeves 14 which are screwed into place as shown in Figures 3 and 4 and in which are slidingly mounted outlet plugs 15. These plugs have a sliding fit in the sleeves 14 but are sufficiently tight to prevent the passage of oil except through the center thereof. The lower end of each of the plugs 15 is provided with a head 16 having a close sliding fit on the various bearing sleeves 17. As all of these sleeves, plugs and associated parts are identical, the description of one will apply to all. As indicated in Figure 3, the bearing sleeve is in effect a spool or flanged drum having a plurality of pockets 18 adapted to receive oil from the bore of plug 15. The sleeve 17 is rotatable and as these pockets come beneath the plug 15, lubricant from chamber 10 is forced under pressure into these pockets and eventually the pockets come opposite the opening or passage-way 19 in the lower bearing 20 which is accurately fitted to the surface of the sleeve or spool 17. The passage-way 19 has a double outlet or rather an inlet and an outlet merging with the passage-ways 21 and 22. Arranged on opposite sides of the spool or sleeve 17 are bearings 23 and 24 to keep the lubricant from spilling from the pockets of the spool, said bearings being slidingly mounted in recesses in the casing 25, said recesses accommodating springs 26 for pressing these bearing members against the spool.

From Figure 3 it will be noted that the casing 25 is secured to the reservoir 1 by screws and encloses the various moving parts just described. The lower part of this casing is provided with a header passage-way 27 which is supplied with steam through pipe 28, said steam being supplied from the boiler or other suitable source. A manually actuated valve 29 is provided for each of the inlets 21, said valves being adjustable so that any one or more inlets 21 may be opened to the steam in the header passage-way 27 while the others may remain closed. In this way, steam and oil may be fed through any of the feed pipes 30 or through all of these feed pipes, there being four shown in the drawings though a greater or less number might be used if preferred. The feed pipes 30 are adapted to be directed to the cylinder of an engine, to some moving part or to any desired point. If desired, they might be used on locomotives and certain of the pipes 30 led to the flanges of the driving wheel of the engine for lubricating these flanges. It is also evident that the pipes 30 could deliver lubricant to a spray nozzle or to a brush to be applied to the flange of the drive wheel or to other moving parts.

Where the lubricator is used in connection with a steam boiler, preferably steam is used in the header passage-way 27 and also in the chamber 11. Where the lubricator is used in connection with an air compressor or other devices, other forms of fluid might be used, as for instance, air which would act substantially in the same manner as the steam for forcing the lubricant to the desired point.

In order that the device may feed a measured quantity, the various spools 17 are caused to rotate and the speed at which they rotate determines the amount of lubricant dispensed. Each of these spools is preferably provided with a square aperture through which a square shaft 31 extends, said shaft at one end being journalled in a suitable socket in the casing 25 and at the opposite end in the end of shaft 32, which shaft is rigidly secured to the gear wheel 33 and on which the rocker arm 34 is pivotally mounted. The rocker arm 34 carries a pawl 35 adapted to engage the teeth of the gear wheel 33 whereby when the arm 34 is oscillated or moved back and forth, the gear wheel 33 will be intermittently moved so as to rotate the arm 34 and the parts associated therewith. By varying the speed of movement of the arm 34, the speed of rotation of the spools 17 may be varied and, consequently, the quantity of lubricant will be correspondingly varied. It is, of course, evident that the shaft 32 could be rotated by a belt and pulley or in some other manner. It is also evident that if desired, the chamber 11 could be connected to the bottom of the steam boiler so as to carry full boiler pressure in the form of cold water on the upper side of the piston.

It is further evident that other means may be provided to impose pressure upon the lubricant for delivery against spools 17, which for instance, may be accomplished by eliminating the piston 5, connecting hydrostatic pressure directly into chamber 10 and extending the outlet plugs 15 to near the top of chamber 10 so that the lubricant floating on the water will be forced out until the chamber is filled with water, this being the same principle as now used with hydrostatic lubricators. Another means of carrying the lubricant under pressure may be provided by substituting a flexible diaphragm for the piston and constructing the chamber 10 of a shape to suit the movement of the diaphragm as the lubricant is fed out.

It is further evident that the spool or flanged drum with pockets to convey the lubricant from the pressure chamber may be displaced by a revolving disc with pockets or apertures or a disc having recesses or teeth, all of which would be alike in the purpose of this invention.

What I claim is:

1. A lubricator, comprising a reservoir, a piston arranged in said reservoir for dividing the same into a lubricant chamber and a pressure chamber, means for directing fluid under pressure into the pressure chamber for causing the piston to press against the lubricant in the lubricant chamber, a hollow reciprocating plug connected with the reservoir through which said lubricant is adapted to be forced, a rotatable measuring spool for receiving said lubricant and delivering the same in measured quantities, said plug being pressed against said spool by the lubricant for maintaining a tight connection, and means for directing the measured lubricant to a desired point.

2. A lubricator, comprising a reservoir for receiving lubricant, means for maintaining said lubricant under pressure, a discharge plug for discharging the lubricant, said discharge plug being capable of reciprocation, a rotatable measuring spool formed with pockets for receiving lubricant from the discharge plug, the pressure of the lubricant on the discharge plug causing the same to snugly fit the spool, means formed with a passage-way for receiving the lubricant from said pockets, means for providing fluid under pressure for forcing said lubricant through said passage-way, and means for directing said fluid and lubricant to a discharge point.

3. A lubricator, comprising a reservoir for receiving lubricant, means for maintaining said lubricant under pressure, a plurality of measuring spools, each spool being formed with a plurality of pockets, means for directing lubricant to each of said spools, means forming a discharge passage-way leading from each of said spools, means for independently directing fluid to said passage-way for forcing the lubricant from the passage-way to a discharge point, and a manually actuated valve for each of said passage-ways for controlling the entrance of fluid thereto whereby any of said spools may be caused to function.

4. In a lubricator, a reservoir, a plurality of discharge members leading from said reservoir, means for causing each of said discharge members to function independently and to lead to a discharge point simultaneously, and rotatable measuring devices for said discharge member for measuring the quantity of lubricant discharged through each of the discharge members.

5. In a lubricator, a reservoir adapted to receive a quantity of lubricant, means for maintaining lubricant under pressure while in the reservoir, mechanically operated means for feeding the lubricant from the reservoir, said means including a rotatable spool structure provided with a plurality of cavities on the periphery, means for receiving the lubricant from these cavities, means for directing the lubricant to a discharge point, and means for controlling the admission of fluid to the means for directing the lubricant to a discharge point.

6. A lubricator, comprising a reservoir, a piston in the reservoir for pressing the lubricant, a plurality of sliding outlet members, each outlet member having a bore extending therethrough and a bearing surface at the outer end, a measuring spool positioned to be engaged by said outer end, each of said measuring spools having a plurality of pockets for receiving lubricant from said outlet members, a discharge passage-way leading from each of said spools independently, means for directing a fluid into said passage-ways, and a valve for each of said passage-ways for independently controlling the discharge of lubricant from each of said spools.

7. A lubricator, comprising a reservoir for receiving lubricant, means for providing pressure on said lubricant in the reservoir, a plurality of sliding outlet plugs fitted in the bottom of the reservoir and in free communication with the lubricant therein, each of said plugs having an enlarged arc-shaped outer face, a rotating spool for each plug, said spools engaging the arc-shaped face of the plugs, each of said spools having a plurality of spaced lubricant receiving sockets, a bearing member having a passage-way therethrough, said bearing member having an arc-shaped face fitting against the spools, said passage-way opening into said arc-shaped face so as to receive lubricant from the pockets of the spools, a pair of spring pressed covering members engaging each of said spools for covering the part not covered by the plugs and the bearing member, means forming a discharge passage-way leading from the passage-way in said bearing member, and means presenting an inlet fluid passage-way leading to the passage-way in said bearing member, an inlet valve for said inlet passage-way for controlling the fluid entering therein, each of said spools having an independent inlet valve associated therewith whereby the discharge from each of the spools will be regulated, and means for rotating said spools.

8. In a device of the type described, a reservoir adapted to contain a quantity of fluid, means for maintaining said fluid under pressure, a fluid conveying plug, a plurality of receptacles adapted to be moved consecutively into communication with said conveying plug, said plug being held in contact with the top edges of said receptacles by the force of the pressure of the fluid within the reservoir, thus providing novel means for automatically taking up wear between the plug and the receptacles, whereby a liquid-tight communication is provided between the plug and the receptacles at all times.

9. In a device of the type described, a reservoir adapted to contain a quantity of fluid, means for maintaining said fluid under pressure, a fluid conveying plug, a plurality of receptacles adapted to be moved consecutively into communication with said conveying plug, said plug being held in contact with the top edges of said receptacles by the force of the pressure of the fluid within the reservoir, thus providing novel means for automatically taking up wear between the plug and the receptacles, whereby a liquid-tight communication is provided between the plug and the receptacles at all times, auxiliary means for keeping the receptacles filled with the liquid until said receptacles are conveyed to the outlet, and means for holding said auxiliary means in yielding engagement with the tops of said receptacles so as to provide a liquid-tight cover for the receptacles and also for automatically taking up wear.

ALFRED H. OELKERS.